(12) United States Patent
Yang

(10) Patent No.: US 11,305,190 B2
(45) Date of Patent: Apr. 19, 2022

(54) LOCATION INDICATION INFORMATION DISPLAY METHOD, ELECTRONIC APPARATUS, AND STORAGE MEDIUM

(71) Applicant: TENCENT TECHNOLOGY (SHENZHEN) COMPANY LIMITED, Shenzhen (CN)

(72) Inventor: Jin Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/921,881

(22) Filed: Jul. 6, 2020

(65) Prior Publication Data
US 2020/0330866 A1 Oct. 22, 2020

Related U.S. Application Data

(63) Continuation of application No. PCT/CN2019/078803, filed on Mar. 20, 2019.

(30) Foreign Application Priority Data

Apr. 27, 2018 (CN) .......................... 201810390708.0

(51) Int. Cl.
*A63F 13/525* (2014.01)
*A63F 13/2145* (2014.01)
(Continued)

(52) U.S. Cl.
CPC ........ *A63F 13/525* (2014.09); *A63F 13/2145* (2014.09); *A63F 13/5375* (2014.09); *A63F 13/5378* (2014.09)

(58) Field of Classification Search
CPC .... A63F 13/52; A63F 13/525; A63F 13/5375; A63F 13/5378; A63F 2300/6653
See application file for complete search history.

(56) References Cited

U.S. PATENT DOCUMENTS 8,841,535 B2 * 9/2014 Collins ..................... G06F 3/16
  84/615
2001/0029203 A1 10/2001 Shoji et al.
(Continued)

FOREIGN PATENT DOCUMENTS

CN 107469354 A 12/2017
CN 107519644 A 12/2017
(Continued)

OTHER PUBLICATIONS

The World Intellectual Property Organization (WIPO) International Search Report for PCT/CN2019/078803 dated Apr. 29, 2019 7 Pages (including translation).
(Continued)

*Primary Examiner* — James S. McClellan
(74) *Attorney, Agent, or Firm* — Anova Law Group, PLLC

(57) ABSTRACT

A location indication information display method is provided for an electronic device. The method includes obtaining a distance between a first virtual object and a second virtual object in a virtual scene, and obtaining location indication information of the second virtual object according to the distance. The distance is used to indicate a degree at which display of the location indication information occludes a field-of-view image, and a greater distance indicating a lower degree at which display of the location indication information occludes a field-of-view image. The method also includes displaying the location indication information of the second virtual object in a field-of-view image of the first virtual object, where the location indication information of the second virtual object have different display content and display styles in response to different distances.

18 Claims, 9 Drawing Sheets

(51) Int. Cl.
*A63F 13/5375* (2014.01)
*A63F 13/5378* (2014.01)

(56) References Cited

U.S. PATENT DOCUMENTS

| | | | |
|---|---|---|---|
| 2002/0004421 A1 | 1/2002 | Itai | |
| 2002/0090995 A1 | 7/2002 | Haga et al. | |
| 2008/0043022 A1 | 2/2008 | Ishihara | |
| 2011/0077078 A1 | 3/2011 | Taoka et al. | |
| 2019/0060758 A1* | 2/2019 | Ge | G06F 3/16 |
| 2019/0118078 A1 | 4/2019 | Li | |

FOREIGN PATENT DOCUMENTS

| | | | |
|---|---|---|---|
| CN | 107890664 A | 4/2018 | |
| CN | 107930114 A | 4/2018 | |
| CN | 108525300 A | 9/2018 | |
| JP | 2000140417 A | 5/2000 | |
| JP | 2001286678 A | 10/2001 | |
| JP | 2002024857 A | 1/2002 | |
| JP | 2002163684 A | 6/2002 | |
| JP | 4712911 B2 | 6/2011 | |
| JP | 2017047088 A | 3/2017 | |
| KR | 20140034395 A | 3/2014 | |

OTHER PUBLICATIONS

The State Intellectual Property Office of the People's Republic of China (SIPO) Office Action 1 for 201810390708.0 dated Mar. 21, 2019 7 Pages (including translation).
The Japan Patent Office (JPO) Notification of Reasons for Refusal for Application No. 2020-548964 and Translation dated Dec. 6, 2021 7 Pages.
Metal Gear Rising Revengeance Official Operation Guide, First Edition, Japan, Enterbrain Co., Ltd., Mar. 4, 2013, p. 18. 5 pages.
Killzone 2, Dengeki PlayStation, Japan, ASCII Media Works Co., Ltd. Apr. 24, 2009, vol. 15, No. 17, pp. 34-37. 8 pages.
Techamazing, "Terminator 2 3D ( Battle Royale )—iOS / Android—Gameplay," YouTube [online] [video], Nov. 1, 2017, Retrieved from the Internet:URL: https://www.youtube.com/watch?v=BR-7gHUz8Og, See especially 0:49, 1:18-1:21, [retrieved on Nov. 29, 2021]. 4 pages.

* cited by examiner

LOCATION INDICATION INFORMATION DISPLAY METHOD, ELECTRONIC APPARATUS, AND STORAGE MEDIUM

RELATED APPLICATIONS

This application is a continuation application of PCT Patent Application No. PCT/CN2019/078803, filed on Mar. 20, 2019, which claims priority to Chinese Patent Application No. 2018103907080, entitled "LOCATION INDICATION INFORMATION DISPLAY METHOD AND APPARATUS, ELECTRONIC APPARATUS, AND STORAGE MEDIUM" and filed on Apr. 27, 2018, both of which are incorporated herein by reference in their entirety.

FIELD OF THE TECHNOLOGY

This application relates to the field of computer technologies and, in particular, to a location indication information display method, an electronic apparatus, and a storage medium.

BACKGROUND

With development of computer technologies and diversification of terminal functions, more types of electronic games can be played on a terminal. In the electronic games, virtual objects and virtual scenes are often displayed, and in a team game mode, location indication information of a virtual object may further be displayed, to mark the virtual object.

Currently, a location indication information display method is usually displaying location indication information, such as an object name of a virtual object and a level of the virtual object, above the virtual object according to a preset display style in response to displaying the virtual object in a field-of-view image of the virtual object. However, with such display methods, the display style is often fixed, the display effect is often not intuitive, and display efficiency is often low. The disclosed methods and systems are directed to solve one or more problems set forth above and other problems.

SUMMARY

Embodiments of the present disclosure provide a location indication information display method, an electronic apparatus, and a storage medium, to resolve the problems of non-intuitive display effect, and/or low display efficiency.

According to one aspect of the present disclosure, a location indication information display method is provided for an electronic device. The method includes obtaining a distance between a first virtual object and a second virtual object in a virtual scene, and obtaining location indication information of the second virtual object according to the distance. The distance is used to indicate a degree at which display of the location indication information occludes a field-of-view image, and a greater distance indicating a lower degree at which display of the location indication information occludes a field-of-view image. The method also includes displaying the location indication information of the second virtual object in a field-of-view image of the first virtual object, where the location indication information of the second virtual object have different display content and display styles in response to different distances.

According to another aspect of the present disclosure, an electronic device for location indication information display is provided. The electronic device includes a memory storing computer program instructions; and a processor coupled to the memory. When executing the computer program instructions, the processor is configured to perform: obtaining a distance between a first virtual object and a second virtual object in a virtual scene; obtaining location indication information of the second virtual object according to the distance, and displaying the location indication information of the second virtual object in a field-of-view image of the first virtual object. The distance is used to indicate a degree at which display of the location indication information occludes a field-of-view image, a greater distance indicating a lower degree at which display of the location indication information occludes a field-of-view image, and the location indication information of the second virtual object have different display content and display styles in response to different distances.

According to an aspect, a non-transitory computer-readable storage medium is provided, storing a computer program, the computer program, when executed by a processor, implementing: obtaining a distance between a first virtual object and a second virtual object in a virtual scene, and obtaining location indication information of the second virtual object according to the distance. The distance is used to indicate a degree at which display of the location indication information occludes a field-of-view image, and a greater distance indicating a lower degree at which display of the location indication information occludes a field-of-view image. The computer program also cause the processor to implement: displaying the location indication information of the second virtual object in a field-of-view image of the first virtual object, where the location indication information of the second virtual object have different display content and display styles in response to different distances.

Other aspects of the present disclosure can be understood by those skilled in the art in light of the description, the claims, and the drawings of the present disclosure.

BRIEF DESCRIPTION OF THE DRAWINGS

To describe technical solutions in embodiments of the present disclosure more clearly, the accompanying drawings for describing the embodiments are briefly described. Apparently, the accompanying drawings in the following description show merely some embodiments of the present disclosure, and a person of ordinary skill in the art may obtain other drawings from the accompanying drawings without creative efforts.

DETAILED DESCRIPTION

Figure 1:
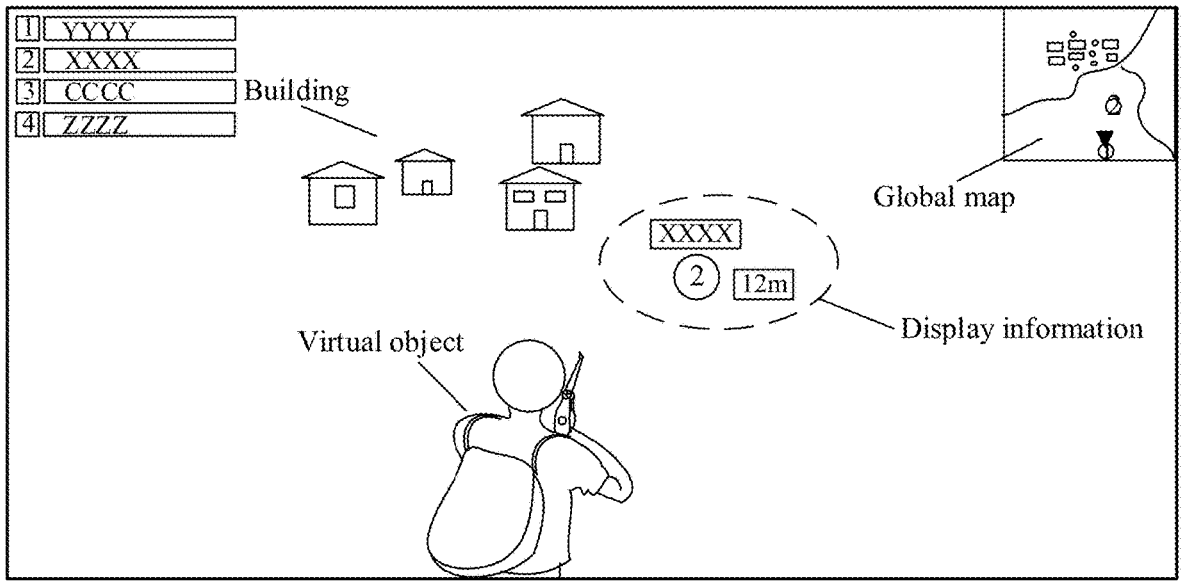
FIG. 1 is a schematic diagram of a terminal interface according to an embodiment of the present disclosure.

To make objectives, technical solutions, and advantages of the present disclosure clearer, the following further describes in detail certain embodiments of the present disclosure with reference to the accompanying drawings.

Embodiments of the present disclosure may relate to an electronic game scene or a simulation training scene. Using the electronic game scene as an example, a user may perform an operation on a user terminal in advance, and a game configuration file of the electronic game may be downloaded after the terminal detects the operation of the user. The game configuration file may include an application, interface display data, virtual scene data, or the like of the electronic game, so that the user may call the game configuration file when logging in to the electronic game on the terminal, to render and display an electronic game interface. The user may perform a touch operation on the terminal, and after detecting the touch operation, the terminal may obtain game data corresponding to the touch operation and render and display the game data. The game data may include the virtual scene data, behavioral data of a virtual object in the virtual scene, and the like.

The virtual scene included in the embodiments of the present disclosure may be used for simulating a three-dimensional virtual space, or may be used for simulating a two-dimensional virtual space, and the three-dimensional virtual space or the two-dimensional virtual space may be an open space. The virtual scene may be used for simulating an actual environment in reality. For example, the virtual scene may include sky, land, ocean, and the like, and the land may include environmental factors such as a desert and a city. The user may control a virtual object to move in the virtual scene, the virtual object may be a virtual avatar used for representing the user in the virtual scene, or may be a virtual avatar used for representing a living thing associated with the user in the virtual scene, for example, a pet of the user. The virtual avatar may be in any form, for example, a person or an animal, and is not limited in the embodiments of the present disclosure. The virtual scene may include a plurality of virtual objects, and each virtual object in the virtual scene has an own shape and volume, and occupies a part of space in the virtual scene.

Using a shooting game as an example, in the virtual scene, the user may control the virtual object to fall freely, glide, or fall after a parachute is opened in the sky; or to run, jump, creep, bend forward in the land; or control the virtual object to swim, float, or dive in the ocean. Certainly, the user may further control the virtual object to ride in a vehicle to move in the virtual scene. The foregoing scenes are used as an example only herein, which is not specifically limited in the embodiments of the present disclosure. The user may alternatively control the virtual object to fight against another virtual object by using a weapon. The weapon may be a cold weapon, or may be a hot weapon. This is not specifically limited in the embodiments of the present disclosure.

When rendering and displaying the foregoing virtual scene, the terminal may display the virtual scene in full screen, and the terminal may alternatively independently display a global map in a first target area in the current display interface while displaying the virtual scene in the current display interface. In an embodiment, the terminal may alternatively display the global map only when detecting a click operation on a target button. The global map is configured to display a thumbnail of the virtual scene, the thumbnail being used for describing geographic features, such as terrain, a landform, and a geographic location, corresponding to the virtual scene. Certainly, the terminal may alternatively display a thumbnail of a virtual scene within a specific distance around the current virtual object in the current display interface, and display a thumbnail of an entire virtual scene in a second target area in the current display interface of the terminal when detecting a click operation on the global map, to help the user not only view a virtual scene around the user, but also view the entire virtual scene. When detecting a zoom operation on the entire thumbnail, the terminal may alternatively zoom in or out and display the entire thumbnail. Specific display locations and shapes of the first target area and the second target area may be set according to users' operation habits.

For example, the first target area may be a rectangular area or the like in an upper right corner, a lower right corner, an upper left corner, or a lower left corner of the current display interface, to avoid blocking an excessively large area in the virtual scene. The second target area may be a left square area or a right square area of the current display interface. Certainly, the first target area and the second target area may alternatively be circular areas or areas of other shapes, and the specific display location and shape of the target area are not limited in the embodiments of the present disclosure. For example, as shown in FIG. 1, the terminal displays a virtual scene on a current display interface, virtual objects and buildings being displayed in the virtual scene, and a global map being displayed in an upper left corner of the current display interface. Other display information may further be included in the current display interface, for example, location indication information of the second virtual object may be included.

Because the virtual object is a virtual avatar of the user, using a first-person viewing angle as an example, a virtual scene seen by the user is usually a virtual scene observed from a viewing angle of the virtual object, and in reality, a viewing angle of a person when the person moves is usually that the person faces forward. A viewing angle of the virtual object is a viewing angle of the virtual scene. For the viewing angle of the virtual scene, the terminal may display areas corresponding to different angles in the same virtual scene according to different viewing angles.

In the embodiments of the present disclosure, a terminal of a specific user is used as an example, a virtual object controlled by the terminal of the user is referred to as a first virtual object, and another virtual object is referred to as a second virtual object, or a virtual object that belongs to the same team as the first virtual object is referred to as a second virtual object. No limitation is imposed in the embodiments of the present disclosure. In the terminal of the user, the virtual scene may be displayed from any viewing angle, and the displayed virtual scene may include the second virtual object located in the display area, a virtual scene seen by the user being a field-of-view image of the first virtual object.

In an embodiment, a server may provide two display formats for the first virtual object controlled by the terminal of the user. A first display format is from a first-person viewing angle. In the first display format, the virtual scene displayed by the terminal of the user may only include a hand or an arm of the first virtual object, or a weapon held in a hand of the first virtual object. The first display format is used for simulating a scene of observing the virtual scene from the viewing angle of the first virtual object, and a camera is located at an eye of the first virtual object. A second display format is from a third-person viewing angle. In the second display format, the virtual scene displayed by the terminal of the user may further include the first virtual object, and the camera is located behind the first virtual object. The terminal may display the first virtual object in the virtual scene, so that the user may see an action, a surrounding environment, and the like of the first virtual object controlled by the user in the virtual scene. A specific display format adopted by the terminal of the user is not specifically limited in the embodiments of the present disclosure.

Figure 2:
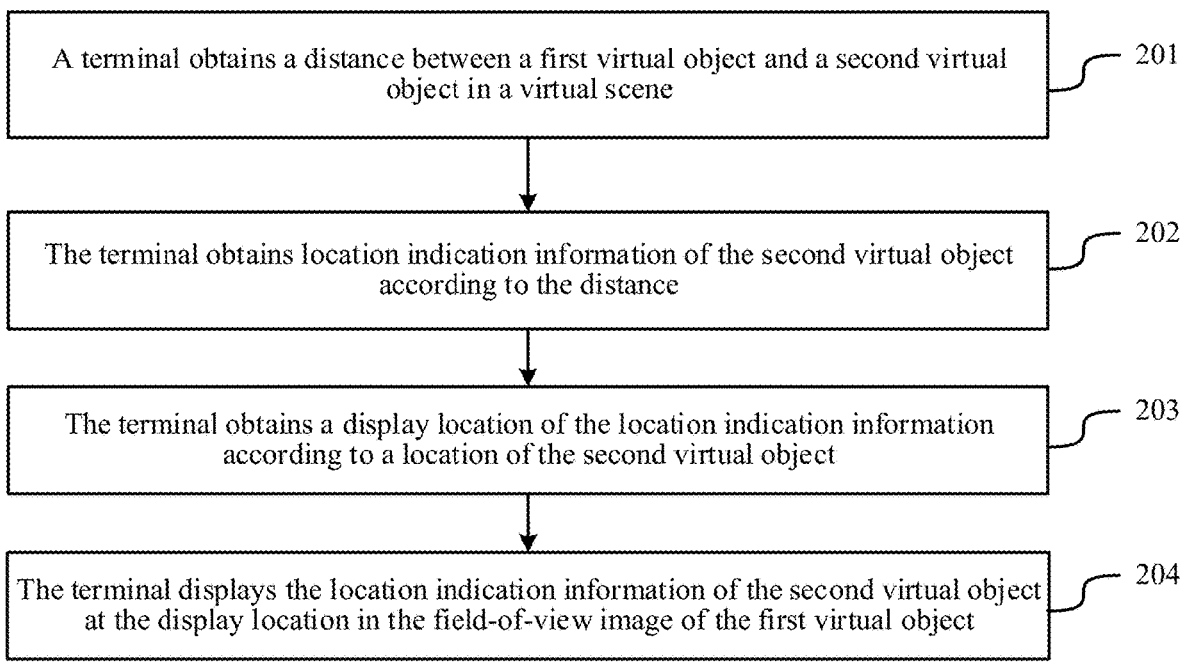
FIG. 2 is a flowchart of a location indication information display method according to an embodiment of the present disclosure.

FIG. 2 is a flowchart of a location indication information display method according to an embodiment of the present disclosure. The method is applied to an electronic apparatus, the electronic apparatus may be provided as a terminal, or may be provided as a server, which is not limited in the embodiments of the present disclosure. The following is only described by using an example in which the electronic apparatus is provided as a terminal. Referring to FIG. 2, the location indication information display method includes the followings.

201. A terminal obtains a distance between a first virtual object and a second virtual object in a virtual scene.

The terminal may display location indication information of the second virtual object in a field-of-view image of the first virtual object, so that a user of the terminal may learn which second virtual object is the second virtual object, a location of the second virtual object, and the like according to the location indication information. The location indication information of the second virtual object may include an indication icon of the second virtual object, or may include an object name of the second virtual object, or may include the distance between the first virtual object and the second virtual object. Certainly, the location indication information of the second virtual object may further include other information, which is not specifically limited.

In the embodiments of the present disclosure, the terminal may obtain display content and a display style of the location indication information of the second virtual object according to the distance between the first virtual object and the second virtual object. Therefore, the terminal may obtain the distance between the first virtual object and the second virtual object in the virtual scene as a basis for obtaining the display content and the display style of the location indication information.

Specifically, the terminal may obtain the distance between the first virtual object and the second virtual object according to coordinate locations of the first virtual object and the second virtual object. In the embodiments of the present disclosure, the distance between the first virtual object and the second virtual object is a distance along a horizontal direction in a coordinate system of the virtual scene, or may be understood as a length of a projection of a connection line between the first virtual object and the second virtual object along the horizontal direction. Certainly, in an embodiment, the terminal may alternatively obtain a length of the connection line between the first virtual object and the second virtual object, and uses the length as the distance between the first virtual object and the second virtual object, to actually simulate the distance between the first virtual object and the second virtual object. In a possible implementation, in a parachuting scene or a scene of swimming or diving in an ocean, the distance between the first virtual object and the second virtual object may alternatively be a distance along a vertical direction in the coordinate system of the virtual scene, and is not specifically limited.

Figure 3:
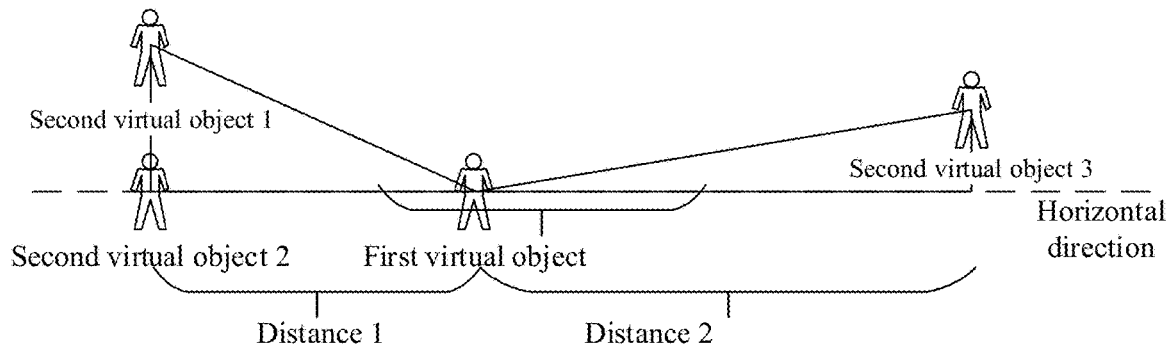
FIG. 3 is a schematic diagram of a method for obtaining a distance between a first virtual object and a second virtual object according to an embodiment of the present disclosure.

For example, in an electronic game scene shown in FIG. 3, an example in which the second virtual object is a virtual object that belongs to the same team as the first virtual object is used. The first virtual object has three teammates, that is, there are three second virtual objects in the virtual scene, referred to as second virtual objects 1, 2, and 3 herein. The terminal may obtain distances between the second virtual objects and the first virtual object respectively. The second virtual object 1 and the second virtual object 2 have a same location along the horizontal direction in the coordinate system of the virtual scene are the same, but have a distance along the vertical direction, and then the terminal may obtain a distance between the second virtual object 1 and the first virtual object and a distance between the second virtual object 2 and the first virtual object along the horizontal direction respectively, both being referred to as a distance 1. The terminal may further obtain a distance between the second virtual object 3 and the first virtual object along the horizontal direction as a distance 2.

202. The terminal obtains location indication information of the second virtual object according to the distance.

After obtaining the distance between the first virtual object and the second virtual object, the terminal may obtain location indication information of the second virtual object according to the distance, the location indication information being used for uniquely identifying the second virtual object. The distance may indicate a degree at which display of the location indication information occludes a field-of-view image. For example, a greater distance indicates a lower degree at which display of the location indication information occludes a field-of-view image. Specifically, in response to different distances, the location indication information of the second virtual object may have different display content and display styles. Correspondingly, step 202 may include the following steps.

2021. The terminal obtains display content of the location indication information of the second virtual object according to the distance.

In an embodiment, the terminal may obtain the indication icon and the object name of the second virtual object, and obtain the distance between the first virtual object and the second virtual object. Certainly, in an embodiment, the location indication information of the second virtual object may further include other information, for example, a health value and the like of the second virtual object. In the embodiments of the present disclosure, the location indication information of the second virtual object includes the indication icon and the object name of the second virtual object and the distance between the first virtual object and the second virtual object is used for description. Information of the second virtual object specifically included in the location indication information is not limited in the embodiments of the present disclosure.

Specifically, a target threshold may be set in the terminal, and specific to-be-obtained location indication information in the foregoing location indication information may be determined according to a relationship between the distance and the target threshold. In an embodiment, when the distance is less than or equal to the target threshold, the terminal obtains the indication icon and the object name of the second virtual object and the distance as the display content of the location indication information of the second virtual object; and when the distance is greater than the target threshold, the terminal obtains the indication icon and the object name of the second virtual object as the display content of the location indication information of the second virtual object. The target threshold may be preset by a related technician, or may be adjusted by the user according to using habits of the user, and a value of the target threshold is not limited in the embodiments of the present disclosure.

In one embodiment, if a distance between the first virtual object and the second virtual object is relatively small, that is, the second virtual object is located in an area within a specific range of the first virtual object, and the first virtual object needs to learn of the distance between the first virtual object and the second virtual object, to communicate with the second virtual object, complete tasks in the virtual scene with the second virtual object, fight against other virtual objects with the second virtual object, or the like, the terminal may mark the indication icon, the object name, and the distance for the first virtual object. If a distance between the first virtual object and the second virtual object is relatively large, that is, the second virtual object is not located in the area within the specific range of the first virtual object, because the distance between the first virtual object and the second virtual object is relatively large, the two cannot complete tasks together or fight against other virtual objects in the area within the specific range of the first virtual object. Thus, the first virtual object does not need to learn of the specific distance between the second virtual object and the first virtual object. Therefore, to reduce occlusion or interference on a field of view of the first virtual object, the terminal may mark the indication icon and the object name without marking the distance for the first virtual object.

For example, as shown in FIG. 3, assuming that the target threshold is 400 m, both a distance 1 between the second virtual object 1 and the first virtual object and the distance 1 between the second virtual object 2 and the first virtual object are 95 m, the distance 2 between the second virtual object 3 and the first virtual object is 450 m, then the terminal may obtain indication icons and object names of the second virtual objects 1 and 2 and the distance 1, and may further obtain an indication icon and an object name of the second virtual object 3.

The indication icon of the second virtual object may also be used for uniquely identifying the second virtual object. For example, different second virtual objects may have different numbers, and indication icons of different second virtual objects may include corresponding numbers. Indication icon colors of different second virtual objects may be different. In this way, the user may also distinguish the second virtual objects through the indication icon colors of the second virtual objects, and certainly, may alternatively distinguish the second virtual objects through shapes of the indication icons and the like. No specific limitation is imposed in the embodiments of the present disclosure.

In an embodiment, the indication icon of the second virtual object may further be used for representing a health state and a motion state of the second virtual object, the health state of the second virtual object including a survival state, a seriously injured state, and a knocked-out state. The survival state indicates that the second virtual object still survives and is not seriously injured. The seriously injured state indicates that the second virtual object is seriously injured, and a health value is gradually decreasing over time. The knocked-out state indicates that the health value of the second virtual object is decreased to zero, and the second virtual object is knocked out in the virtual scene. The motion state of the second virtual object may include a no-vehicle state, an in-vehicle state, and the like. Specifically, the indication icon of the second virtual object may change according to a change of at least one of the health state and the motion state of the second virtual object. Certainly, when types of vehicles ridden by the second virtual object are different, indication icons may also be different.

Figure 4:
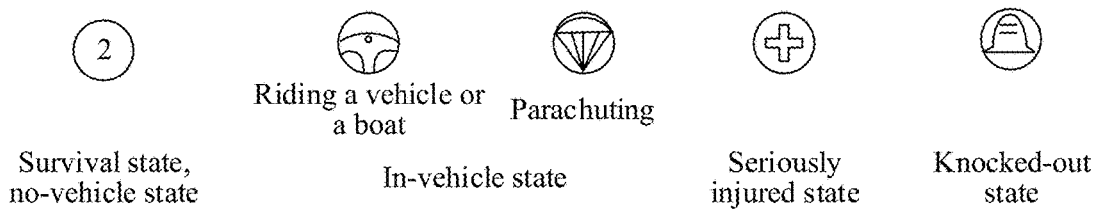
FIG. 4 is a schematic diagram of an indication icon of a second virtual object according to an embodiment of the present disclosure.

For example, as shown in FIG. 4, when the second virtual object is in the survival state and the no-vehicle state, the indication icon of the second virtual object may include a number of the second virtual object, and the indication icon color corresponds to the second virtual object. When the second virtual object is in the in-vehicle state, an indication icon color of the second virtual object may correspond to the second virtual object, and the indication icon includes a type of the vehicle. When the second virtual object is in the seriously injured state, the second virtual object needs to be rescued, an indication icon color of the second virtual object corresponds to the second virtual object, and the indication icon includes information about a need for a rescue. When the second virtual object is in the knocked-out state, an indication icon color of the second virtual object corresponds to the second virtual object, and the indication icon may include an identifier in a shape of a tombstone.

Certainly, the foregoing is only an example in which the indication icon is obtained according to at least one of the health state and the motion state of the second virtual object. In an embodiment, the second virtual object may alternatively include another motion state, for example, a state of running, walking, swimming, or the like. The indication icon may be preset by a related technician, and correspond to each state, or may be adjusted by the user according to habits of the user. Certainly, the indication icon may alternatively be fixed without changing according to a change of at least one of the health state and the motion state of the second virtual object. The health state, the motion state, and a specific style of the indication icon of the second virtual object are not limited in the embodiments of the present disclosure.

2022. The terminal obtains a display style of the location indication information of the second virtual object according to the distance.

In response to different distances between the first virtual object and the second virtual objects, the location indication information of the second virtual object may have different display styles, that is, the display style of the location indication information changes according to a change of the distance. A correspondence between the distance and the display style may be pre-stored in the terminal. When the terminal obtains a distance between the first virtual object and the second virtual object, the terminal may obtain a display style corresponding to the distance according to the correspondence. The display style may include at least a display size and transparency. Certainly, the display style may further include a background color, a text color, a text font, a text border style, and the like, and is not specifically limited in embodiments of the present disclosure.

In an embodiment, a plurality of intervals may be set in the terminal, and each interval corresponds to different changing formats of the display style. After obtaining the distance between the first virtual object and the second virtual object, the terminal may obtain an interval within which the distance falls, then obtain a display style corresponding to the distance according to the changing formats of the display style in the interval.

In response to different setting cases of the plurality of intervals, changing cases of the display style of the location indication information are different. The setting cases of the plurality of intervals may include the following two cases.

Case 1: For the plurality of intervals, a plurality of target thresholds may be set in the terminal, and interval division may be performed for the distance between the first virtual object and the second virtual objects according to the plurality of target thresholds, to obtain a plurality of consecutive intervals. An ending point of a previous interval is a starting point of a current interval, and the previous interval and the current interval are two adjacent intervals in the plurality of consecutive intervals.

Specifically, an example in which a quantity of the plurality of target thresholds is two is used. A first target threshold and a second target threshold may be set in the terminal, and then three intervals may be obtained through division: a first interval [0, the first target threshold], a second interval [the first target threshold, the second target threshold], and a third interval [the second target threshold, +∞]. The following settings may be performed: in the first interval [0, the first target threshold], as the distance changes, the display size of the location indication information changes, but the transparency of the location indication information remains unchanged, where in an embodiment, a display size is negatively correlated to a distance, and a greater distance indicates a smaller display size; in the second interval [the first target threshold, the second target threshold], as the distance changes, the transparency of the location indication information changes, but the display size of the location indication information remains unchanged, where in an embodiment, transparency is positively correlated to a distance, and a greater distance indicates greater transparency; and in the third interval [the second target threshold, +∞], as the distance changes, the display size and the transparency of the location indication information both remain unchanged. The first target threshold and the second target threshold may be preset by a related technician, or may be adjusted by the user according to using habits of the user, and are not limited in the embodiments of the present disclosure. The second target threshold may be the same as or different from the target threshold in step 2021. When the second target threshold is the same as the target threshold in step 2021, in the third interval [the second target threshold, +∞], the location indication information may alternatively not include the distance between the first virtual object and the second virtual object.

Correspondingly, step 2022 may include: when the distance falls within the first interval, the terminal obtains a display size corresponding to the distance and transparency corresponding to the first interval as a display style of the location indication information of the second virtual object, where a greater distance indicates a smaller display size corresponding to the distance; when the distance falls within the second interval, the terminal obtains transparency corresponding to the distance and a display size corresponding to the second interval as a display style of the location indication information of the second virtual object, where a greater distance indicates greater transparency corresponding to the distance; and when the distance falls within the third interval, the terminal obtains a display size and transparency corresponding to the third interval as a display style of the location indication information of the second virtual object.

That is, when the distance falls within the first interval [0, the first target threshold], the terminal may obtain a display size corresponding to the distance according to a changing format of a display size in the interval and obtain target transparency. When the distance falls within the second interval [the first target threshold, the second target threshold], the terminal may obtain transparency corresponding to the distance according to a changing format of transparency in the interval and obtain a display size corresponding to the interval. When the distance falls within the third interval [the second target threshold, +∞], the terminal may obtain transparency and a display size corresponding to the interval.

Figure 5:
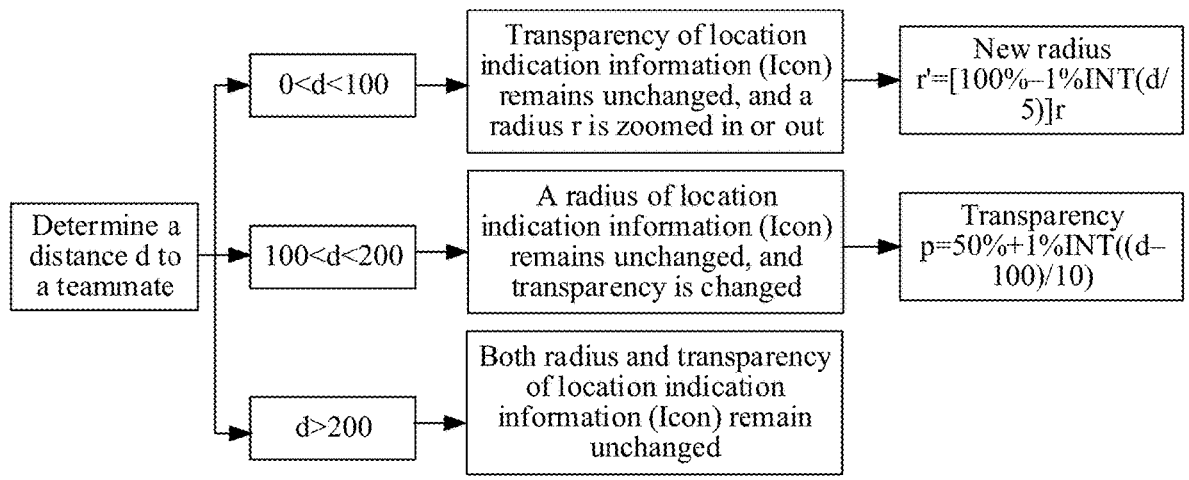
FIG. 5 is a schematic diagram of a changing manner of a display style of location indication information according to an embodiment of the present disclosure.

For example, as shown in FIG. 5, an example in which the first target threshold is 100 m, the second target threshold is 200 m, the first interval is [0, 100], the second interval is [100, 200], and the third interval is [200, +∞] is used. In [0, 100], a changing format of a display size of the location indication information is described by using a radius change of an indication icon in the location indication information as an example, other location indication information is zoomed in or out in an equal proportion according to the radius change of the indication icon. Assuming that the changing format of the display size is: r'=[100%−1% INT (d/5)]r, where r' is a radius of an indication icon corresponding to a current distance, INT( ) is a rounding function, d is a distance to a teammate, that is, a distance between a second virtual object and a first virtual object, and r is a target radius, that is, a radius of the indication icon when the distance is zero. Both r' and r may be values greater than or equal to 0. In [100, 200], assuming that a changing format of transparency of the location indication information is: p=50%+1% INT((d−100)/10), where p is transparency, INT( ) is a rounding function, and d is a distance to a teammate, that is, a distance between a first virtual object and a second virtual object. In [100, 200], a display size of the location indication information does not change any more, and a radius of an indication icon is the radius when the distance is 100 in the foregoing formula. In [200, +∞], a display size and transparency of the location indication information do not change any more, a radius of an indication icon is the radius when the distance is 100, transparency is the transparency when the distance is 200, and icon is the location indication information of the second virtual object.

Figure 6:
FIG. 6 is an actual interface diagram of a terminal according to an embodiment of the present disclosure.
Figure 7:
FIG. 7 is an actual interface diagram of a terminal according to an embodiment of the present disclosure.
Figure 8:
FIG. 8 is an actual interface diagram of a terminal according to an embodiment of the present disclosure.

For example, as shown in actual interface diagrams in FIG. 6 to FIG. 8, an example in which the first target threshold is 100 m, the second target threshold is 200 m, and the target threshold in step 2021 is 400 m is used. A display size of the location indication information of the second virtual object in FIG. 7 is smaller than a display size of the location indication information in FIG. 6, and a display size of the location indication information of the second virtual object in FIG. 8 is smaller than the display sizes of the location indication information in FIG. 6 and FIG. 7. Transparency of the location indication information in FIG. 6 is the same as that in FIG. 7, and transparency of the location indication information in FIG. 8 is greater than the transparency of the location indication information in FIG. 6 and FIG. 7.

The foregoing only describes the changing format of the display size of the location indication information by using the radius change of the indication icon in the location indication information as an example. In an embodiment, the display size of the location indication information may alternatively be achieved by zooming in or out the location indication information in an equal proportion, and a specific changing format of a zoom factor is not limited in the embodiments of the present disclosure.

Case 2: The plurality of intervals may be obtained by setting target thresholds of two ends of each interval in the terminal, the plurality of intervals do not need to be consecutive, and intervals may overlap, or may be spaced apart by a specific distance.

In an embodiment, the terminal may set different distance change intervals for transparency and a display size. Optionally, the terminal may set a change interval of the display size to [a third target threshold, a fourth target threshold] and a change interval of the transparency to [a fifth target threshold, a sixth target threshold], where the fourth target threshold is greater than the third target threshold, and the sixth target threshold is greater than the fifth target threshold. When values of the foregoing target thresholds are different, two intervals may overlap, two intervals may be spaced apart by a specific distance, or an ending point of one interval in the two intervals may overlap with a starting point of the other interval. No limitation is imposed in the embodiments of the present disclosure. All specific values of the foregoing plurality of target thresholds may be set by a related technician, or be adjusted by the user according to the habits of the user, and are not limited in the embodiments of the present disclosure.

Certainly, in addition to the foregoing two cases, when obtaining a display style, alternatively, the terminal may obtain only a display size, where transparency is a fixed value, obtain only transparency, where a display size is a fixed value, or obtain other display style information in addition to the display size and the transparency. One or more specific types of display style information included in a display style and a specific changing format of each type of display style information are not specifically limited in the embodiments of the present disclosure.

Step 2021 and step 2022 are a procedure of obtaining the display content and the display style of the location indication information of the second virtual object according to the distance. In an embodiment, the terminal may first perform step 2021, and then perform step 2022; or may first perform step 2022, and then perform step 2021. Certainly, the terminal may alternatively perform step 2021 and step 2022 at the same time. An execution sequence of step 2021 and step 2022 is not specifically limited in the embodiments of the present disclosure.

203. The terminal obtains a display location of the location indication information according to a location of the second virtual object.

Because the location indication information is used for marking the second virtual object, the terminal may obtain the display location of the location indication information according to the location of the second virtual object, to reflect an association between the second virtual object and the location indication information. A form of expression of the virtual object in the virtual scene is actually a role model, and the role model may be a three-dimensional model, or may be a two-dimensional model. Correspondingly, the location of the second virtual object in step 203 may be a location of the role model of the second virtual object.

The terminal may further determine whether the second virtual object is in the field-of-view image of the first virtual object according to the location of the second virtual object and the field-of-view image of the first virtual object. Based on the determination results, the process for the terminal to obtain the display location of the location indication information in step 203 may further include the following two cases.

Case 1: When the second virtual object is in the field-of-view image of the first virtual object, the terminal obtains an area above or below the second virtual object as the display location of the location indication information according to the location of the second virtual object.

In the embodiments of the present disclosure, only an example in which the terminal obtains the area above the second virtual object as the display location of the location indication information is used for description. In an embodiment, the display location may be another area around the second virtual object, for example, an area located left or right to the second virtual object, and is not specifically limited in the embodiments of the present disclosure.

Case 2: When the second virtual object is not in the field-of-view image of the first virtual object, the terminal obtains a location of the second virtual object relative to the first virtual object; and the terminal uses a marginal area that is in the field-of-view image and that corresponds to the location as the display location of the location indication information.

In the case 2, because the second virtual object is not in the field-of-view image of the first virtual object, but actually, the first virtual object still needs to learn of the location indication information of the second virtual object, the terminal may display the location indication information of the second virtual object in the marginal area of the field-of-view image, to avoid occluding an excessively large area in the field-of-view image of the first virtual object. The terminal may obtain the display location of the location indication information according to the location of the second virtual object relative to the first virtual object, to represent an approximate direction of the first virtual object in which the second virtual object is located.

Figure 9:
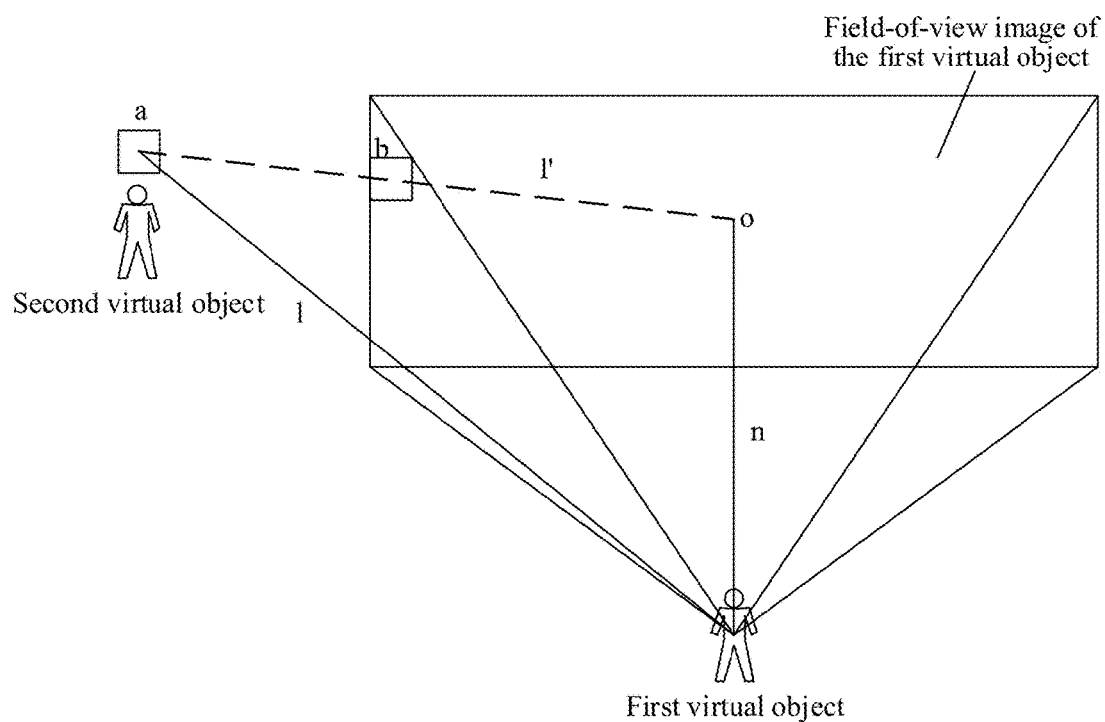
FIG. 9 is a schematic diagram of a method for obtaining a display location of location indication information according to an embodiment of the present disclosure.

Specifically, the terminal may use, according to a connection line between the area above the second virtual object and the first virtual object, an overlap of a projection of the connection line in the field-of-view image of the first virtual object and the marginal area as the display location of the location indication information. For example, as shown in FIG. 9, a line-of-sight of the first virtual object is n, n is perpendicular to the field-of-view image, and an intersection is 0, the second virtual object is not in the field-of-view image of the first virtual object, the area above the second virtual object is at a location a, a connection line between the location a and the first virtual object is 1, and the terminal uses an overlap of a projection 1' of the connection line 1 in the field-of-view image and a marginal area of the field-of-view image, that is, a location b, as the display location of the location indication information.

204. The terminal displays the location indication information of the second virtual object at the display location in the field-of-view image of the first virtual object.

After obtaining the display content, the display style, and the display location of the location indication information of the second virtual object, the terminal may perform step 204 to display the location indication information of the second virtual object. A user may intuitively learn of a distance between the first virtual object and the second virtual object through the display style of the location indication information and specific types of information included in the location indication information. Therefore, the foregoing location indication information display method has an intuitive display effect and high display efficiency.

In an embodiment, in Case 2 in step 203, that is, when the second virtual object is not in the field-of-view image of the first virtual object, partial information in the location indication information of the second virtual object is displayed at the display location in the field-of-view image of the first virtual object, so that occlusion on the field-of-view image of the first virtual object may be reduced. In an embodiment, the partial information includes any one of the following two types of information:

A first type of information is an indication icon of the second virtual object.

A second type of information is the indication icon of the second virtual object and a distance between the first virtual object and the second virtual object.

That is, when the second virtual object is not in the field-of-view image of the first virtual object, and the distance is less than or equal to the target threshold, the terminal may display the indication icon of the second virtual object and the distance between the first virtual object and the second virtual object. Certainly, when the second virtual object is not in the field-of-view image of the first virtual object, and the distance is greater than the target threshold, the terminal may only display the indication icon of the second virtual object.

In an embodiment, when the location indication information of the second virtual object further includes other content, the terminal in step 204 may further display other content, or only display the foregoing indication icon or distance. No specific limitation is imposed in the embodiments of the present disclosure.

Furthermore, to represent the location of the second virtual object relative to the first virtual object more accurately, when the second virtual object is not in the field-of-view image of the first virtual object, the terminal may further display the location of the second virtual object relative to the first virtual object at the display location in the field-of-view image of the first virtual object. In this case, the location of the second virtual object relative to the first virtual object can be intuitively displayed without occluding an excessively large area in the field-of-view image of the first virtual object, leading to high display efficiency.

Specifically, a display format of the location of the second virtual object relative to the first virtual object may be in a form of an arrow indication icon. An arrow direction of the arrow indication icon may be: pointing from an intersection of a viewing angle direction of the first virtual object and the field-of-view image to a projection direction of a direction of a target area of the second virtual object in the field-of-view image. The intersection of the viewing angle direction of the first virtual object and the field-of-view image is a center point of the field-of-view image, that is, the arrow direction points from the center point of the field-of-view image to the area above the second virtual object.

Figure 10:
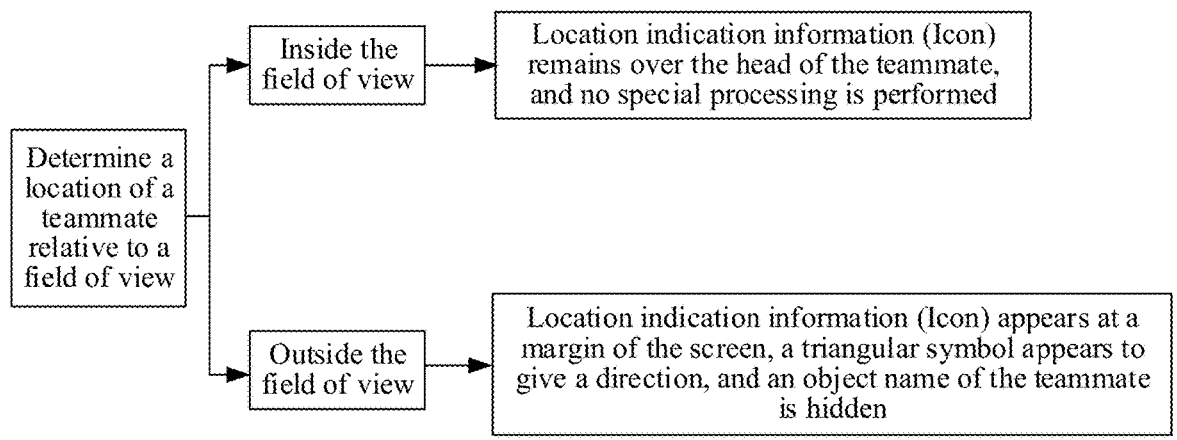
FIG. 10 is a schematic diagram of a location indication information display method according to an embodiment of the present disclosure.
Figure 11:
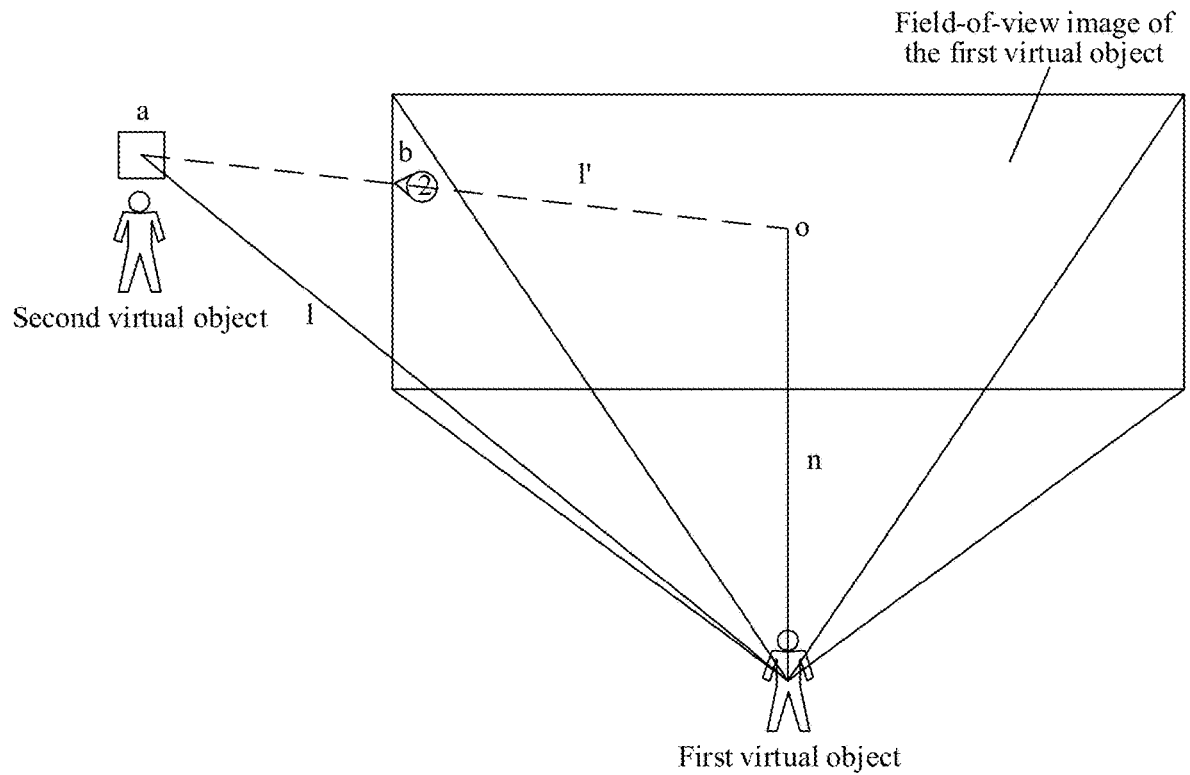
FIG. 11 is a schematic diagram of a location indication information display method according to an embodiment of the present disclosure.
Figure 12:
FIG. 12 is an actual interface diagram of a terminal according to an embodiment of the present disclosure.

For example, in the electronic game scene shown in FIG. 10, the terminal may determine a location of a teammate in the field of view. If the teammate is in the field of view, the location indication information, icon, of the second virtual object is located over the head of the teammate, that is, at an area right above the second virtual object; if the teammate is out of the field of view, icon may be displayed at a margin of the screen, that is, the marginal area of the field-of-view image, a triangular symbol may appear to give a direction, an object name of the teammate is hidden, that is, the object name of the second virtual object is not displayed, and the location of the second virtual object relative to the first virtual object is indicated by using the arrow indication icon. As shown in FIG. 11, it is assumed that a number of the second virtual object is 2, the second virtual object is in a survival state and a no-vehicle state, a line-of-sight of the first virtual object is n, n is perpendicular to the field-of-view image, an intersection is 0, the second virtual object is not in the field-of-view image of the first virtual object, a target area of the second virtual object is at a location a, a connection line between the location a and the first virtual object is 1, and a projection of the line 1 in the field-of-view image is V. The terminal may display the location indication information of the second virtual object in the marginal area of the field-of-view image, where the arrow indication icon indicates the location of the second virtual object relative to the first virtual object, and a direction of the arrow indication icon points from the point O to a. An actual interface diagram may be as shown in FIG. 12, second virtual object numbered as 2, 3, and 4 are all located outside the field-of-view image of the first virtual object, location indication information of the three second virtual objects may also have transparency, to avoid occluding an excessively large area on the virtual scene.

Step 203 and step 204 are part of the process of displaying the location indication information of the second virtual object in the field-of-view image of the first virtual object. Because the display content and the display style of the location indication information of the second virtual object are all obtained according to the distance between the first virtual object and the second virtual object, the user may intuitively and quickly perceive the distance between the first virtual object and the second virtual object according to location indication information included in the location indication information and the display style of the location indication information. The foregoing location indication information display method has an intuitive display effect and high display efficiency.

In step 201 to step 204, the terminal may obtain a distance between the first virtual object and the second virtual object in real time, and update and display location indication information of the second virtual object according to a change of the distance. Specifically, the terminal may calculate a location of the second virtual object, display content, a display style, and a display location of the location indication information of the second virtual object in a field-of-view image of a next frame according to data of each frame, to render and display the field-of-view image of the next frame.

In an embodiment, the field-of-view image of the second virtual object may further include a plurality types of display modes. The plurality of display modes include a second display mode, the second display mode being a mode after zooming in the virtual scene by a target multiple. When the display mode of the field-of-view image is switched from a first display mode to the second display mode, the terminal may further display the location indication information of the second virtual object in the field-of-view image according to target transparency, the target transparency being greater than transparency of the location indication information in the first display mode. The first display mode is any display mode other than the second display mode. After the field-of-view image is zoomed in and displayed, the transparency of the location indication information may be increased, so that a display effect of the location indication information is very light, to avoid a case in which the location indication information occludes an excessively large area of the field-of-view image, thereby reducing occlusion on the field-of-view image of the first virtual object.

For example, in the electronic game scene, the first virtual object obtains an optical sight of a firearm in the virtual scene, the optical sight may be a red dot sight, a two-times sight, a four-times sight, an eight-times sight, or an optical sight of another multiple. When detecting an enable operation on the optical sight, the terminal may switch a display mode of a current field-of-view image of the terminal to the second display mode, the second display mode being a mode displayed after zooming in the field-of-view image through the optical sight by a multiple corresponding to the optical sight. When the optical sight is enabled, the terminal may set transparency of the location indication information of the second virtual object to the target transparency, so that the user may not see that an excessively large field of view is occluded by the location indication information in the zoomed-in field-of-view image, thereby greatly improving user experience.

In an embodiment, at least one of the display content and the display style of the location indication information of the second virtual object may change according to at least one of a health state and a motion state of the second virtual object. As described in step 2021, the indication icon of the second virtual object may change according to a state change of the second virtual object. On basis of this, if the second virtual object is in a knocked-out state, because the second virtual object is knocked out, within a specific duration after the second virtual object is knocked out, the first virtual object may obtain locations of other virtual objects according to the location of the second virtual object, or pick up virtual items of the second virtual object according to the location of the second virtual object. However, the first virtual object does not need to learn of the location of the second virtual object subsequently, and if the location indication information of the second virtual object is displayed in the field-of-view image all the time, the field of view of the first virtual object may be partly occluded. Therefore, the terminal may further have a location indication information display setting: the terminal cancels display of the location indication information of the second virtual object in the field-of-view image of the first virtual object in a case that it is detected that the second virtual object is in a knocked-out state and a duration of the knocked-out state reaches a target duration.

The target duration may be preset by a related technician, or may be adjusted by the user according to using habits of the user, for example, the target duration may be 30 s, and a specific value of the target duration is not limited in the embodiments of the present disclosure.

Figure 13:
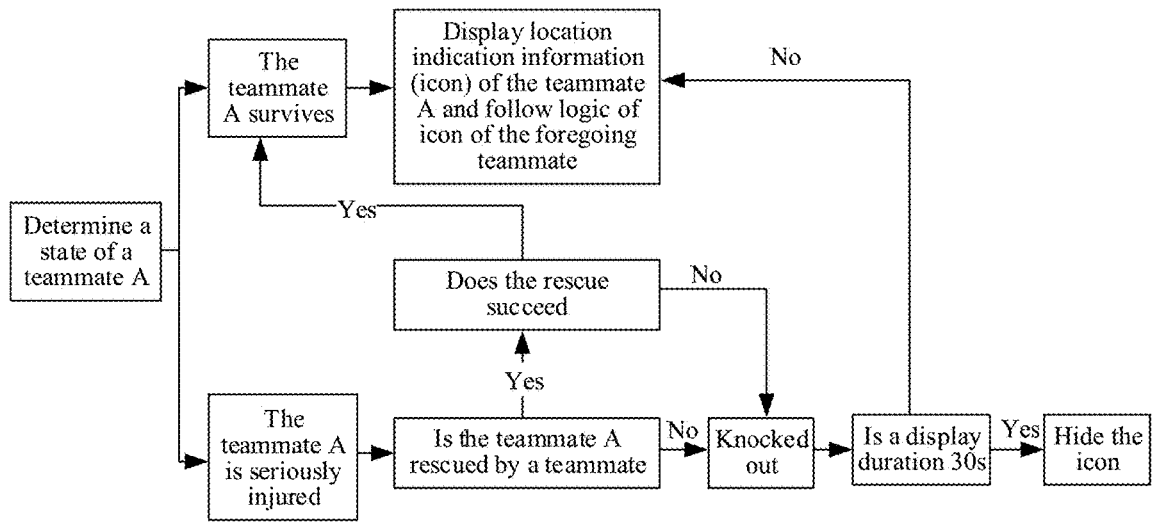
FIG. 13 is a schematic diagram of a location indication information display method according to an embodiment of the present disclosure.
Figure 14:
FIG. 14 is an actual interface diagram of a terminal according to an embodiment of the present disclosure.
Figure 15:
FIG. 15 is an actual interface diagram of a terminal according to an embodiment of the present disclosure.
Figure 16:
FIG. 16 is an actual interface diagram of a terminal according to an embodiment of the present disclosure.

For example, as shown in FIG. 13, the terminal may determine a state of a teammate A, the teammate A being a second virtual object. If the teammate A is seriously injured, where an actual interface diagram is shown in FIG. 14, location indication information of the teammate A is a need for a rescue, and the terminal may determine whether the teammate A is rescued by a teammate. If the rescue succeeds, the teammate A survives, that is, the second virtual object is in a survival state, and the terminal displays the location indication information, icon, of the teammate A, where a specific display style follows the logic shown from step 201 to step 204. If the teammate A is not rescued by a teammate, or the rescue fails, the teammate A is in a knocked-out state, and the terminal may display icon of the teammate A in the field-of-view image within a target duration of 30 s after the teammate A is knocked out, where a display style of the teammate A also follows the logic shown from step 201 to step 204 within the 30 s, and an actual interface diagram is shown in FIG. 15. If the display time reaches 30 s, the terminal hides icon of the second virtual object, where an actual interface diagram is shown in FIG. 16. In FIG. 14, FIG. 15, and FIG. 16, icon of the second virtual object may have transparency to avoid occluding an excessively large area in the virtual scene. Certainly, in an embodiment, the terminal may cancel display of the location indication information of the second virtual object in the field-of-view image, but may continuously display the location indication information of the second virtual object in a global map. In this case, although the user cannot see the location indication information in the field-of-view image, the user may learn of, from the location indication information in the global map, the location of the second virtual object when the second virtual object is knocked out.

According to the embodiments of the present disclosure, a distance between a first virtual object and a second virtual object is obtained, location indication information of the second virtual object and a corresponding display style are obtained, so that the location indication information is displayed in a field-of-view image of the first virtual object based on the display style obtained according to the distance, to help a user intuitively and quickly perceive a direction of the second virtual object and an approximate distance to the second virtual object according to specific information and a display style included in the location indication information. Therefore, the location indication information display method provides an intuitive display effect and high display efficiency.

Furthermore, in the embodiments of the present disclosure, the location of the second virtual object relative to the first virtual object is displayed when the second virtual object is not in the field-of-view image of the first virtual object, so that the location of the second virtual object is prompted more intuitively without occluding an excessively large area in the field-of-view image of the first virtual object, thereby improving the display efficiency.

Furthermore, in the embodiments of the present disclosure, the location indication information of the second virtual object is displayed according to greater transparency when the display mode of the field-of-view image is switched to the second display mode, to reduce collusion on the field-of-view image of the first virtual object.

Additional embodiments of the present disclosure may be formed by using any combination of all the foregoing embodiments, and details are not described herein.

Figure 17:
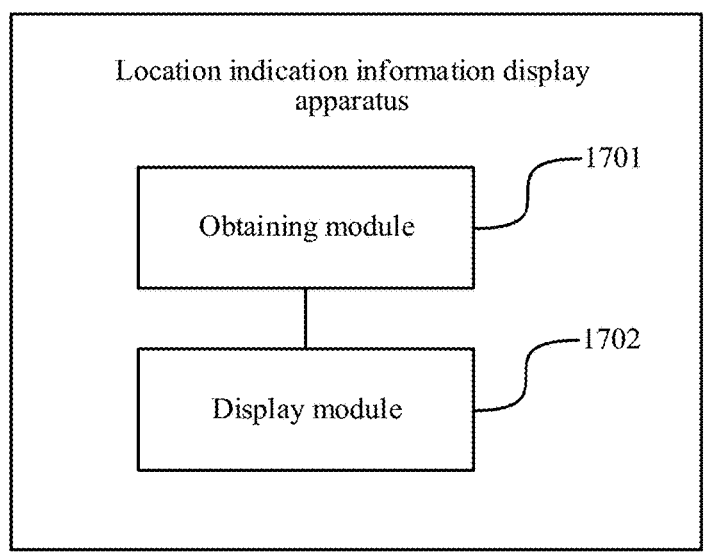
FIG. 17 is a schematic structural diagram of a location indication information display apparatus according to an embodiment of the present disclosure.

FIG. 17 is a schematic structural diagram of a location indication information display apparatus according to an embodiment of the present disclosure. Referring to FIG. 17, the apparatus includes: an obtaining module 1701, and a display module 1702.

The obtaining module 1701 is configured to obtain a distance between a first virtual object and a second virtual object in a virtual scene. The obtaining module 1701 may be further configured to obtain location indication information of the second virtual object according to the distance, a greater distance indicating a lower degree at which display of the location indication information occludes the field-of-view image. The display module 1702 is configured to display the location indication information of the second virtual object in a field-of-view image of the first virtual object.

In an embodiment, the obtaining module 1701 is configured to: obtain an indication icon and an object name of the second virtual object and the distance as display content of the location indication information of the second virtual object in a case that the distance is less than or equal to a target threshold; and obtain the indication icon and the object name of the second virtual object as display content of the location indication information of the second virtual object in a case that the distance is greater than the target threshold.

In an embodiment, a display style of the location indication information changes according to a change of the distance.

In an embodiment, the obtaining module 1701 is configured to: obtain, in a case that the distance falls within a first interval, a display size corresponding to the distance and transparency corresponding to the first interval as the display style of the location indication information of the second virtual object, a greater distance indicating a smaller display size corresponding to the distance; obtain, in a case that the distance falls within a second interval, transparency corresponding to the distance and a display size corresponding to the second interval as the display style of the location indication information of the second virtual object, a greater distance indicating greater transparency corresponding to the distance; and obtain, in a case that the distance falls within a third interval, a display size and transparency corresponding to the third interval as the display style of the location indication information of the second virtual object.

In an embodiment, the display module 1702 is configured to: obtain a display location of the location indication information according to a location of the second virtual object; and display the location indication information of the second virtual object at the display location in the field-of-view image of the first virtual object.

In an embodiment, the display module 1702 is configured to obtain an area above or below the second virtual object as the display location of the location indication information according to the location of the second virtual object.

In an embodiment, the display module 1702 is configured to: obtain a location of the second virtual object relative to the first virtual object in a case that the second virtual object is not in the field-of-view image of the first virtual object; and use a marginal area that is in the field-of-view image and that corresponds to the location as the display location of the location indication information.

In an embodiment, the display module 1702 is configured to display partial information in the location indication information of the second virtual object at the display location in the field-of-view image of the first virtual object in a case that the second virtual object is not in the field-of-view image of the first virtual object.

In an embodiment, the partial information in the location indication information of the second virtual object includes: an indication icon of the second virtual object; or the indication icon of the second virtual object and a distance between the first virtual object and the second virtual object.

In an embodiment, the display module 1702 is further configured to display the location of the second virtual object relative to the first virtual object at the display location in the field-of-view image of the first virtual object in a case that the second virtual object is not in the field-of-view image of the first virtual object.

In an embodiment, the display module 1702 is further configured to display the location indication information of the second virtual object in the field-of-view image according to target transparency in a case that a display mode of the field-of-view image is switched from a first display mode to a second display mode, the target transparency being greater than transparency of the location indication information in the first display mode, and the second display mode being a mode of displaying the virtual scene after zooming in the virtual scene by a target multiple.

In an embodiment, at least one of the display content and the display style of the location indication information of the second virtual object changes according to a change of at least one of a health state and a motion state of the second virtual object.

In an embodiment, the display module 1702 is further configured to cancel display of the location indication information of the second virtual object in the field-of-view image of the first virtual object in a case that it is detected that the second virtual object is in a knocked-out state and a duration of the knocked-out state reaches a target duration.

By using an apparatus provided in the embodiments of the present disclosure, a distance between a first virtual object and a second virtual object is obtained, location indication information of the second virtual object and a corresponding display style are obtained, so that the location indication information is displayed in a field-of-view image of the first virtual object based on the display style obtained according to the distance, to help a user intuitively and quickly perceive a direction of the second virtual object and an approximate distance to the second virtual object according to specific information and a display style included in the location indication information. Therefore, the location indication information display method provides an intuitive display effect and high display efficiency.

When the location indication information display apparatus provided in the foregoing embodiments displays the location indication information, it is illustrated with an example of division of each function module. In an embodiment, the function distribution may be finished by different function modules according to the requirements, that is, divide the internal structure of the apparatus into different function modules, so as to finish all or part of the functions described above. In addition, the location indication information display apparatus and the location indication information display method embodiments provided in the foregoing embodiments belong to one conception. For the specific implementation process, reference may be made to the method embodiments, and details are not described herein again.

Figure 18:
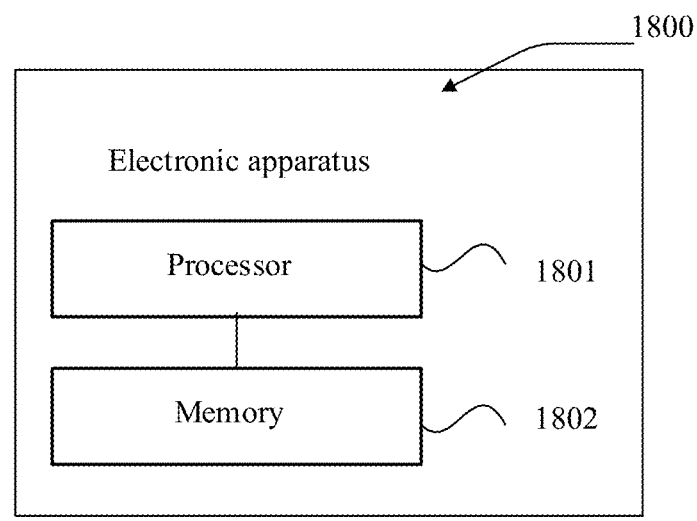
FIG. 18 is a schematic structural diagram of an electronic apparatus according to an embodiment of the present disclosure.

FIG. 18 is a schematic structural diagram of an electronic apparatus according to an embodiment of the present disclosure. The electronic apparatus 1800 may vary greatly due to different configurations or performance, and may include one or more processors (for example, central processing units (CPU)) 1801 and one or more memories 1802. The memory 1802 stores at least one instruction, and the at least one instruction is loaded and executed by the processor 1801 to perform: obtaining a distance between a first virtual object and a second virtual object in a virtual scene; obtaining location indication information of the second virtual object according to the distance, a greater distance indicating a lower degree at which display of the location indication information occludes a field-of-view image; and displaying the location indication information of the second virtual object in a field-of-view image of the first virtual object.

In an embodiment, the processor 1801 is configured to: obtain an indication icon and an object name of the second virtual object and the distance as display content of the location indication information of the second virtual object in a case that the distance is less than or equal to a target threshold; and obtain the indication icon and the object name of the second virtual object as display content of the location indication information of the second virtual object in a case that the distance is greater than the target threshold.

In an embodiment, a display style of the location indication information changes according to a change of the distance.

In an embodiment, the processor 1801 is configured to: obtain, in a case that the distance falls within a first interval, a display size corresponding to the distance and transparency corresponding to the first interval as the display style of the location indication information of the second virtual object, a greater distance indicating a smaller display size corresponding to the distance; obtain, in a case that the distance falls within a second interval, transparency corresponding to the distance and a display size corresponding to the second interval as the display style of the location indication information of the second virtual object, a greater distance indicating greater transparency corresponding to the distance; and obtain, in a case that the distance falls within a third interval, a display size and transparency corresponding to the third interval as the display style of the location indication information of the second virtual object.

In an embodiment, the processor 1801 is configured to: obtain a display location of the location indication information according to a location of the second virtual object; and display the location indication information of the second virtual object at the display location in the field-of-view image of the first virtual object.

In an embodiment, the processor 1801 is configured to: obtain an area above or below the second virtual object as the display location of the location indication information according to the location of the second virtual object.

In an embodiment, the processor 1801 is further configured to perform the following steps: obtaining a location of the second virtual object relative to the first virtual object in a case that the second virtual object is not in the field-of-view image of the first virtual object; and using a marginal area that is in the field-of-view image and that corresponds to the location as the display location of the location indication information.

In an embodiment, the processor 1801 is configured to: display partial information in the location indication information of the second virtual object at the display location in the field-of-view image of the first virtual object in a case that the second virtual object is not in the field-of-view image of the first virtual object.

In an embodiment, the partial information in the location indication information of the second virtual object includes any one of the following: an indication icon of the second virtual object; and the indication icon of the second virtual object and a distance between the first virtual object and the second virtual object.

In an embodiment, the processor 1801 is further configured to display the location of the second virtual object relative to the first virtual object at the display location in the field-of-view image of the first virtual object in a case that the second virtual object is not in the field-of-view image of the first virtual object.

In an embodiment, the processor 1801 is further configured to display the location indication information of the second virtual object in the field-of-view image according to target transparency in a case that a display mode of the field-of-view image is switched from a first display mode to a second display mode, the target transparency being greater than transparency of the location indication information in the first display mode, and the second display mode being a mode of displaying the virtual scene after zooming in the virtual scene by a target multiple.

In an embodiment, the processor 1801 is further configured to cancel display of the location indication information of the second virtual object in the field-of-view image of the first virtual object in a case that it is detected that a state of the second virtual object is in a knocked-out state and a duration of the knocked-out state reaches a target duration.

Certainly, the electronic apparatus 1800 may further include components such as a wired or wireless network interface, a keyboard, and an input/output interface, to facilitate the input/output. The electronic apparatus 1800 may further include another component configured to implement functions of a device, and details are not described herein again.

In an embodiment, a computer-readable storage medium is further provided, for example, a memory including instructions, and the foregoing instructions may be executed by a processor to implement following method steps of the location indication information display method: obtaining a distance between a first virtual object and a second virtual object in a virtual scene; obtaining location indication information of the second virtual object according to the distance, a greater distance indicating a lower degree at which display of the location indication information occludes a field-of-view image; and displaying the location indication information of the second virtual object in a field-of-view image of the first virtual object.

In an embodiment, the instruction is loaded and executed by the processor to implement the following method operations: obtaining an indication icon and an object name of the second virtual object and the distance as display content of the location indication information of the second virtual object in a case that the distance is less than or equal to a target threshold; and obtaining the indication icon and the object name of the second virtual object as display content of the location indication information of the second virtual object in a case that the distance is greater than the target threshold.

In an embodiment, a display style of the location indication information changes according to a change of the distance.

In an embodiment, the instruction is loaded and executed by the processor to implement the following method operations: obtaining, in a case that the distance falls within a first interval, a display size corresponding to the distance and transparency corresponding to the first interval as the display style of the location indication information of the second virtual object, a greater distance indicating a smaller display size corresponding to the distance; obtaining, in a case that the distance falls within a second interval, transparency corresponding to the distance and a display size corresponding to the second interval as the display style of the location indication information of the second virtual object, a greater distance indicating greater transparency corresponding to the distance; and obtaining, in a case that the distance falls within a third interval, a display size and transparency corresponding to the third interval as the display style of the location indication information of the second virtual object.

In an embodiment, the instruction is loaded and executed by the processor to implement the following method operations: obtaining a display location of the location indication information according to a location of the second virtual object; and displaying the location indication information of the second virtual object at the display location in the field-of-view image of the first virtual object.

In an embodiment, the instruction is loaded and executed by the processor to implement the following method operations: obtaining an area above or below the second virtual object as the display location of the location indication information according to the location of the second virtual object.

In an embodiment, the instruction is loaded and executed by the processor to implement the following method operations: obtaining a location of the second virtual object relative to the first virtual object in a case that the second virtual object is not in the field-of-view image of the first virtual object; and using a marginal area that is in the field-of-view image and that corresponds to the location as the display location of the location indication information.

In an embodiment, the instruction is loaded and executed by the processor to implement the following method operations: displaying partial information in the location indication information of the second virtual object at the display location in the field-of-view image of the first virtual object in a case that the second virtual object is not in the field-of-view image of the first virtual object.

In an embodiment, the partial information in the location indication information of the second virtual object includes any one of the following: an indication icon of the second virtual object; and the indication icon of the second virtual object and a distance between the first virtual object and the second virtual object.

In an embodiment, the instruction is loaded and executed by the processor to implement the following method operation: displaying the location of the second virtual object relative to the first virtual object at the display location in the field-of-view image of the first virtual object in a case that the second virtual object is not in the field-of-view image of the first virtual object.

In an embodiment, the instruction is loaded and executed by the processor to implement the following method operation: displaying the location indication information of the second virtual object in the field-of-view image according to target transparency in a case that a display mode of the field-of-view image is switched from a first display mode to a second display mode, the target transparency being greater than transparency of the location indication information in the first display mode, and the second display mode being a mode of displaying the virtual scene after zooming in the virtual scene by a target multiple.

In an embodiment, the instruction is loaded and executed by the processor to implement the following method operation: canceling display of the location indication information of the second virtual object in the field-of-view image of the first virtual object in a case that it is detected that the second virtual object is in a knocked-out state and a duration of the knocked-out state reaches a target duration.

For example, the computer-readable storage medium may be a read-only memory (ROM), a random access memory (RAM), a compact disc read-only memory (CD-ROM), a magnetic tape, a floppy disk, an optical data storage device, or the like. A person of ordinary skill in the art may understand that all or some of the steps of the foregoing embodiments may be implemented by using hardware, or may be implemented by a program instructing relevant hardware. The program may be stored in a computer-readable storage medium. The above-mentioned storage medium may be a read-only memory, a magnetic disk, an optical disc, or the like.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A location indication information display method for an electronic device, comprising:
    obtaining a distance between a first virtual object and a second virtual object in a virtual scene;
    obtaining location indication information of the second virtual object according to the distance, wherein the distance is used to indicate a degree at which display of the location indication information occludes a field-of-view image, and a greater distance indicating a lower degree at which display of the location indication information occludes a field-of-view image; and
    displaying the location indication information of the second virtual object in a field-of-view image of the first virtual object, wherein the location indication information of the second virtual object have different display content and display styles in response to different distances,
    wherein:
    when the distance is less than or equal to a target threshold, a display content of the location indication information of the second virtual object includes an indication icon and an object name of the second virtual object and the distance; and
    when the distance is greater than the target threshold, the display content of the location indication information of the second virtual object includes the indication icon and the object name of the second virtual object.

2. The method according to claim 1, wherein a display style of the location indication information changes according to a change of the distance.

3. The method according to claim 2, wherein the obtaining location indication information of the second virtual object according to the distance comprises:
    obtaining, when the distance falls within a first interval, a display size corresponding to the distance and transparency corresponding to the first interval as the display style of the location indication information of the second virtual object, a greater distance indicating a smaller display size corresponding to the distance;
    obtaining, when the distance falls within a second interval, transparency corresponding to the distance and a display size corresponding to the second interval as the display style of the location indication information of the second virtual object, a greater distance indicating greater transparency corresponding to the distance; and
    obtaining, when the distance falls within a third interval, a display size and transparency corresponding to the third interval as the display style of the location indication information of the second virtual object.

4. The method according to claim 1, wherein the displaying the location indication information of the second virtual object in a field-of-view image of the first virtual object comprises:
    obtaining a display location of the location indication information according to a location of the second virtual object; and displaying the location indication information of the second virtual object at the display location in the field-of-view image of the first virtual object.

5. The method according to claim 4, wherein the obtaining a display location of the location indication information according to a location of the second virtual object comprises:
   obtaining an area above or below the second virtual object as the display location of the location indication information according to the location of the second virtual object.

6. The method according to claim 4, wherein the obtaining a display location of the location indication information according to a location of the second virtual object further comprises:
   obtaining a location of the second virtual object relative to the first virtual object when the second virtual object is not in the field-of-view image of the first virtual object; and
   using a marginal area that is in the field-of-view image and that corresponds to the location as the display location of the location indication information.

7. The method according to claim 6, wherein the displaying the location indication information of the second virtual object at the display location in the field-of-view image of the first virtual object comprises:
   displaying partial information in the location indication information of the second virtual object at the display location in the field-of-view image of the first virtual object when the second virtual object is not in the field-of-view image of the first virtual object.

8. The method according to claim 7, wherein the partial information in the location indication information of the second virtual object comprises any one of the following:
   an indication icon of the second virtual object; and
   the indication icon of the second virtual object and the distance between the first virtual object and the second virtual object.

9. The method according to claim 7, wherein the displaying the location indication information of the second virtual object at the display location in the field-of-view image of the first virtual object further comprises:
   displaying the location of the second virtual object relative to the first virtual object at the display location in the field-of-view image of the first virtual object when the second virtual object is not in the field-of-view image of the first virtual object.

10. The method according to claim 1, further comprising:
    displaying the location indication information of the second virtual object in the field-of-view image according to target transparency when a display mode of the field-of-view image is switched from a first display mode to a second display mode, the target transparency being greater than transparency of the location indication information in the first display mode, and the second display mode being a mode of displaying the virtual scene after zooming in the virtual scene by a target multiple.

11. The method according to claim 1, wherein at least one of the display content and the display style of the location indication information of the second virtual object changes according to a change of at least one of a health state and a motion state of the second virtual object.

12. The method according to claim 1, further comprising:
    canceling display of the location indication information of the second virtual object in the field-of-view image of the first virtual object upon detecting that the second virtual object is in a knocked-out state, and a duration of the knocked-out state reaches a target duration.

13. An electronic device, comprising:
    a memory storing computer program instructions; and
    a processor coupled to the memory and, when executing the computer program instructions, configured to perform:
    obtaining a distance between a first virtual object and a second virtual object in a virtual scene;
    obtaining location indication information of the second virtual object according to the distance, wherein the distance is used to indicate a degree at which display of the location indication information occludes a field-of-view image, and a greater distance indicating a lower degree at which display of the location indication information occludes a field-of-view image; and
    displaying the location indication information of the second virtual object in a field-of-view image of the first virtual object, wherein the location indication information of the second virtual object have different display content and display styles in response to different distances,
    wherein:
    when the distance is less than or equal to a target threshold, a display content of the location indication information of the second virtual object includes an indication icon and an object name of the second virtual object and the distance; and
    when the distance is greater than the target threshold, the display content of the location indication information of the second virtual object includes the indication icon and the object name of the second virtual object.

14. The electronic device according to claim 13, wherein the obtaining location indication information of the second virtual object according to the distance comprises:
    obtaining, when the distance falls within a first interval, a display size corresponding to the distance and transparency corresponding to the first interval as a display style of the location indication information of the second virtual object, a greater distance indicating a smaller display size corresponding to the distance;
    obtaining, when the distance falls within a second interval, transparency corresponding to the distance and a display size corresponding to the second interval as the display style of the location indication information of the second virtual object, a greater distance indicating greater transparency corresponding to the distance; and
    obtaining, when the distance falls within a third interval, a display size and transparency corresponding to the third interval as the display style of the location indication information of the second virtual object.

15. The electronic device according to claim 13, wherein the displaying the location indication information of the second virtual object in a field-of-view image of the first virtual object comprises:
    obtaining a display location of the location indication information according to a location of the second virtual object; and
    displaying the location indication information of the second virtual object at the display location in the field-of-view image of the first virtual object.

16. The electronic device according to claim 15, wherein the obtaining a display location of the location indication information according to a location of the second virtual object further comprises:

obtaining a location of the second virtual object relative to the first virtual object when the second virtual object is not in the field-of-view image of the first virtual object; and using a marginal area that is in the field-of-view image and that corresponds to the location as the display location of the location indication information.

17. The electronic device according to claim 16, wherein the displaying the location indication information of the second virtual object at the display location in the field-of-view image of the first virtual object comprises:

displaying partial information in the location indication information of the second virtual object at the display location in the field-of-view image of the first virtual object when the second virtual object is not in the field-of-view image of the first virtual object.

18. A non-transitory computer readable storage medium storing a computer program that, when being executed by a processor, cause the processor to perform:

obtaining a distance between a first virtual object and a second virtual object in a virtual scene;

obtaining location indication information of the second virtual object according to the distance, wherein the distance is used to indicate a degree at which display of the location indication information occludes a field-of-view image, and a greater distance indicating a lower degree at which display of the location indication information occludes a field-of-view image; and displaying the location indication information of the second virtual object in a field-of-view image of the first virtual object, wherein the location indication information of the second virtual object have different display content and display styles in response to different distances, wherein:

when the distance is less than or equal to a target threshold, a display content of the location indication information of the second virtual object includes an indication icon and an object name of the second virtual object and the distance; and when the distance is greater than the target threshold, the display content of the location indication information of the second virtual object includes the indication icon and the object name of the second virtual object.

* * * * *